United States Patent

Tom et al.

[11] Patent Number: 5,882,384
[45] Date of Patent: Mar. 16, 1999

[54] GAS SOURCE AND DISPENSING SYSTEM WITH IN SITU MONITORING OF PRESSURE AND TEMPERATURE

[75] Inventors: Glenn M. Tom, New Milford; James V. McManus, Danbury, both of Conn.

[73] Assignee: Advanced Technology Materials, Inc., Danbury, Conn.

[21] Appl. No.: 858,631

[22] Filed: May 20, 1997

Related U.S. Application Data

[60] Provisional application No. 60/019,021 May 20, 1996.

[51] Int. Cl.$^6$ .................................................. B01D 53/04
[52] U.S. Cl. .............................. 96/111; 96/112; 96/113; 96/117; 96/147
[58] Field of Search ..................... 96/108, 109, 111–114, 96/117, 147

[56] References Cited

U.S. PATENT DOCUMENTS

| | | | |
|---|---|---|---|
| 4,194,890 | 3/1980 | McCombs et al. | 96/113 X |
| 4,197,095 | 4/1980 | White, Jr. et al. | 96/113 X |
| 4,373,938 | 2/1983 | McCombs | 96/114 |
| 4,455,861 | 6/1984 | Alftine | 96/112 X |
| 4,561,287 | 12/1985 | Rowland | 96/111 X |
| 4,627,860 | 12/1986 | Rowland | 96/111 |
| 4,723,967 | 2/1988 | Tom | 96/108 X |
| 4,738,693 | 4/1988 | Tom | 96/108 X |
| 4,744,221 | 5/1988 | Knollmueller | 62/48 |
| 5,401,298 | 3/1995 | Voss | 96/147 X |
| 5,704,965 | 1/1998 | Tom et al. | 95/95 |
| 5,707,424 | 1/1998 | Tom et al. | 95/95 |

FOREIGN PATENT DOCUMENTS

| | | | |
|---|---|---|---|
| 2712250 | 9/1978 | Germany | 96/111 |
| 4-187210 | 7/1992 | Japan | 96/111 |

*Primary Examiner*—Robert Spitzer
*Attorney, Agent, or Firm*—Steven J. Hultquist; Oliver A. M. Zitzmann

[57] ABSTRACT

A fluid storage and dispensing system including a fluid storage and dispensing vessel containing a physical adsorbent material having sorptive affinity for the fluid to be stored in the vessel and subsequently dispensed from the vessel through a valve head assembly. The character of the fluid stored in the vessel, such as its pressure and/or temperature, is non-invasively monitored during the storage (non-dispensing) mode of the system, by a sensing element in the valve head assembly operative coupled with an output device such as a visual output display or a set point-limited alarm.

30 Claims, 3 Drawing Sheets

GAS SOURCE AND DISPENSING SYSTEM WITH IN SITU MONITORING OF PRESSURE AND TEMPERATURE

CROSS-REFERENCE TO RELATED APPLICATION

This application is based on and claims the priority of United States Provisional Patent Application No. 60/019,021 filed May 20, 1996.

BACKGROUND OF THE INVENTION

1. Field of the Invention

This invention relates generally to storage and dispensing systems for the selective dispensing of fluids from a vessel in which the fluid component(s) are sorptively retained by a solid sorbent medium, and are desorptively released from the sorbent medium in the dispensing operation. More particularly, the present invention relates to a method and apparatus for determining internal pressure and temperature in the vessel of the storage and dispensing system, in situ.

2. Description of the Related Art

In a wide variety of industrial processes and applications, there is a need for a reliable source of process fluid(s) which is compact, portable, and available to supply the fluid(s) on demand. Such processes and applications include semiconductor manufacturing, ion implantation, manufacture of flat panel displays, medical treatment, water treatment, emergency breathing equipment, welding operations, space-based applications involving delivery of liquids and gases, etc.

U.S. Pat. No. 4,744,221 issued May 17, 1988 to Karl O. Knollmueller discloses a method of storing and subsequently delivering arsine, by contacting arsine at a temperature of from about −30° C. to about +30° C. with a zeolite of pore size in the range of from about 5 to about 15 Angstroms to adsorb arsine on the zeolite, and then dispensing the arsine by heating the zeolite to an elevated temperature of up to about 175° C. for sufficient time to release the arsine from the zeolite material.

The method disclosed in the Knollmueller patent is disadvantageous in that it requires the provision of heating means for the zeolite material, which must be constructed and arranged to heat the zeolite to sufficient temperature to desorb the previously sorbed arsine from the zeolite in the desired quantity.

The use of a heating jacket or other means exterior to the vessel holding the arsine-bearing zeolite is problematic in that the vessel typically has a significant heat capacity, and therefore introduces a significant lag time to the dispensing operation. Further, heating of arsine causes it to decompose, resulting in the formation of hydrogen gas, which introduces an explosive hazard into the process system. Additionally, such thermally-mediated decomposition of arsine effects substantial increase in gas pressure in the process system, which may be extremely disadvantageous from the standpoint of system life and operating efficiency.

The provision of interiorly disposed heating coil or other heating elements in the zeolite bed itself is problematic since it is difficult with such means to uniformly heat the zeolite bed to achieve the desired uniformity of arsine gas release.

The use of heated carrier gas streams passed through the bed of zeolite in its containment vessel may overcome the foregoing deficiencies, but the temperatures necessary to achieve the heated carrier gas desorption of arsine may be undesirably high or otherwise unsuitable for the end use of the arsine gas, so that cooling or other treatment is required to condition the dispensed gas for ultimate use.

U.S. Pat. No. 5,518,528 issued May 21, 1996 in the names of Glenn M. Tom and James V. McManus, describes a gas storage and dispensing system, for the storage and dispensing of gases, e.g., hydride gases, halide gases, organometallic Group V compounds, etc. which overcomes various disadvantages of the gas supply process disclosed in the Knollmueller patent.

The gas storage and dispensing system of the Tom et al. patent comprises an adsorption-desorption apparatus, for storage and dispensing of gases, including a storage and dispensing vessel holding a solid-phase physical sorbent, and arranged for selectively flowing gas into and out of the vessel. A sorbate gas is physically adsorbed on the sorbent. A dispensing assembly is coupled in gas flow communication with the storage and dispensing vessel, and provides, exteriorly of the vessel, a pressure below the vessel's interior pressure, to effect desorption of sorbate from the solid-phase physical sorbent medium, and flow of desorbed gas through the dispensing assembly. Heating means may be employed to augment the desorption process, but as mentioned above, heating entails various disadvantages for the sorption/desorption system, and it therefore is preferred to operate the Tom et al. system with the desorption being carried out at least partially by pressure differential-mediated release of the sorbate gas from the sorbent medium.

The storage and dispensing vessel of the Tom et al. patent embodies a substantial advance in the art, relative to the prior art use of high pressure gas cylinders. Conventional high pressure gas cylinders are susceptible to leakage from damaged or malfunctioning regulator assemblies, as well as to rupture and unwanted bulk release of gas from the cylinder if the internal gas pressure in the cylinder exceeds permissible limits. Such overpressure may for example derive from internal decomposition of the gas leading to rapid increasing interior gas pressure in the cylinder.

The gas storage and dispensing vessel of the Tom et al. patent thus reduces the pressure of stored sorbate gases by reversibly adsorbing them onto a carrier sorbent, e.g., a zeolite or activated carbon material.

The storage and dispensing system broadly described above is usefully employed for safe storage and dispensing of toxic and hazardous gases, as well as other sorbable fluids. Such storage and dispensing system permits sub-atmospheric pressure storage and use of a wide variety of sorbable fluids which are sorbable onto an appropriate microporous sorbent medium.

The storage and dispensing vessel used in such system may comprise an ordinary high pressure cylinder of the type used to store gases at super-atmospheric pressure levels, but containing a suitable sorbent medium on which the sorbable fluid is stored or adsorbed.

A manual or automated (by electrical or air means) high pressure stainless steel diaphragm valve typically is employed to ensure containment of the sorbable fluid within the storage and dispensing vessel. Under normal conditions, the internal cylinder pressure and temperature are effectively maintained within desired limits, including a pressure level less than 1 atmosphere and a temperature on the order of 25° C. or less. These conditions of pressure and temperature preclude pressure-mediated release, which is a significant risk in conventional practice where cylinders are filled with super-atmospheric pressure gas, and the danger of rupture or leakage is exacerbated by the high pressures involved.

Despite the foregoing advantages of low pressure operation with the aforementioned sorbent-based storage and dispensing system, such storage and dispensing systems during storage and transportation may be exposed to heat or warming conditions which correspondingly warm the sorbent material in the cylinder and result in cylinder pressure increasing to levels in excess of 1 atmosphere.

In use of such sorbent-based storage and dispensing systems, utilizing sorbent media such as zeolite compositions, activated carbon and the like, it has been found that the pressure dependence on temperature in the cylinder is on the order of from 0.5 psi/°C. to 0.75 psi/°C.

In view of such temperature/pressure fluctuations in the storage and transport of the sorbent-based storage and dispensing system, it would be a significant advance in the art to provide a means and method of monitoring the pressure and temperature in the sorbable fluid storage and dispensing vessel of such systems, so that appropriate safety and handling procedures can be utilized, when temperature and/or pressure in the sorbent-containing vessel exceed normal desired operating values.

It is an object of the invention to provide such means and method.

Other objects and advantages of the invention will be more fully apparent from the ensuing disclosure.

SUMMARY OF THE INVENTION

The present invention relates to a fluid storage and dispensing system, comprising a fluid storage and dispensing vessel containing a sorbent material for sorptively holding the fluid, and a dispensing assembly for selectively discharging fluid from the vessel, the dispensing assembly including a flow controller for selectively establishing flow of fluid from the vessel through the dispensing assembly, and selectively terminating flow of fluid from the vessel through the dispensing assembly, with monitoring means disposed in the dispensing assembly upstream of the flow controller for monitoring a process condition of the fluid in the vessel when the flow controller is unactuated and there is no flow of fluid through the dispensing assembly.

A dispensing assembly may for example be coupled in gas flow communication with the storage and dispensing vessel, and constructed and arranged for selective on-demand dispensing of desorbed fluid, after thermal and/or pressure differential-mediated desorption of the fluid from the sorbent material, with the dispensing assembly being constructed and arranged:

(I) to provide, exteriorly of said storage and dispensing vessel, a pressure below said interior pressure, to effect desorption of fluid from the sorbent material, and flow of desorbed fluid from the vessel through the dispensing assembly; and/or (II) to flow thermally desorbed fluid therethrough, and comprising means for heating the sorbent material to effect desorption of the fluid therefrom, so that the desorbed fluid flows from the vessel into the dispensing assembly.

More particularly, the present invention contemplates means and method by which the internal pressure and temperature, or other process conditions (e.g., composition of the fluid) in the storage and dispensing vessel containing sorbent bearing the sorbable fluid are determinable without opening of the containment valve. Thus, the invention contemplates a non-invasive system for monitoring temperature and/or pressure conditions in the sorbent vessel.

In accordance with the invention, the foregoing is accomplished by the provision of pressure and temperature transducers on the upstream side of the valve seat on the containment valve.

By providing pressure and temperature transducers on the upstream side of the flow control valve associated with the storage and dispensing vessel (such valve constituting a component of the dispensing assembly typically comprising valve, flow control, regulator and monitoring means downstream of the flow control cylinder valve), it is possible to readily and continuously monitor the conditions in the interior volume of the storage and dispensing vessel.

By such monitoring, appropriate precautions or remedial steps can be taken when the temperature and/or pressure in the vessel exceeds desired operating limits. For example, in the event that the pressure and/or temperature in the vessel exceeds the desired operating limits, the vessel may be chilled at a constant temperature bath to lower the temperature and/or pressure in the vessel, or otherwise the vessel may be isolated or removed from the exposure conditions giving rise to the overpressure or overtemperature conditions.

The temperature and pressure transducers provided upstream of the valve thus permit integration with the valve head structure of output display means, involving visual output and/or other output modalities, e.g., a buzzer or other alarm when the predetermined setpoint limits of pressure and/or temperature are exceeded.

The sorbent medium in the storage and dispensing system may include any suitable sorbent material. Preferred substrates include crystalline aluminosilicate compositions, e.g., with a pore size in the range of from about 4 to about 13 Å, although crystalline aluminosilicate compositions having larger pores, e.g., so-called mesopore compositions with a pore size in the range of from about 20 to about 40 Å are also potentially usefully employed in the broad practice of the invention.

Examples of such crystalline aluminosilicate compositions include 5A molecular sieve, and preferably a binderless molecular sieve.

Potentially useful carbon sorbent materials include so-called bead activated carbon of highly uniform spherical particle shape, e.g., BAC-MP, BAC-LP, and BAC-G-70R, available from Kreha Corporation of America, New York, N.Y.

Although carbon sorbents and molecular sieve materials such as crystalline aluminosilicates are preferred in many instances, the solid-phase physical sorbent medium may usefully comprise other materials such as silica, alumina, macroreticulate polymers, kieselguhr, etc.

The sorbent materials may be suitably processed or treated to ensure that they are devoid of trace components which deleteriously affect the performance of the gas storage and dispensing system. For example, carbon sorbents may be subjected to washing treatment, e.g., with hydrofluoric acid, to render them sufficiently free of trace components such as metals and oxidic transition metal species.

The present invention comprises the provision of a novel valve head assembly on the storage and dispensing vessel of the storage/dispensing system. The valve head comprises an integrated pressure and/or temperature sensing and output means, including pressure and/or temperature transducers disposed upstream of the active valve element, for sensing of the pressure and/or temperature within the storage and dispensing vessel (containing the sorbent loaded with the sorbable fluid to be dispensed).

The valve head assembly further comprises suitable output means, such as visual display output means, visual and/or auditory alarms, etc., indicating that the sensed pressure and/or temperature have exceeded the set-point limits, or any other output means by which the transducermediated sensing of pressure and/or temperature in the body of the valve upstream of the active valve element is able to be perceived by a human observer or otherwise communicated to an automatic control system for taking of appropriate action when the set-point limits are exceeded. Other aspects and features of the invention will be more fully apparent from the ensuing disclosure.

DETAILED DESCRIPTION OF THE INVENTION, AND PREFERRED EMBODIMENTS THEREOF

The disclosure of U.S. Pat. No. 5,518,528 issued May 21, 1996 in the names of Glenn M. Tom and James V. McManus, and the disclosure of U.S. Pat. No. 5,704,965 issued Jan. 6, 1998 in the names of Glenn M. Tom and James V. McManus for "FLUID STORAGE AND DELIVERY SYSTEM UTILIZING CARBON SORBENT MEDIUM," hereby are incorporated herein by reference in their entirety.

In the ensuing disclosure, the invention will be described with reference to a gas as the sorbate fluid, however, it will be recognized that the invention is broadly applicable to liquids, gases, vapors, and multiphase fluids, and contemplates storage and dispensing of fluid mixtures as well as single component fluids.

Figure 1:
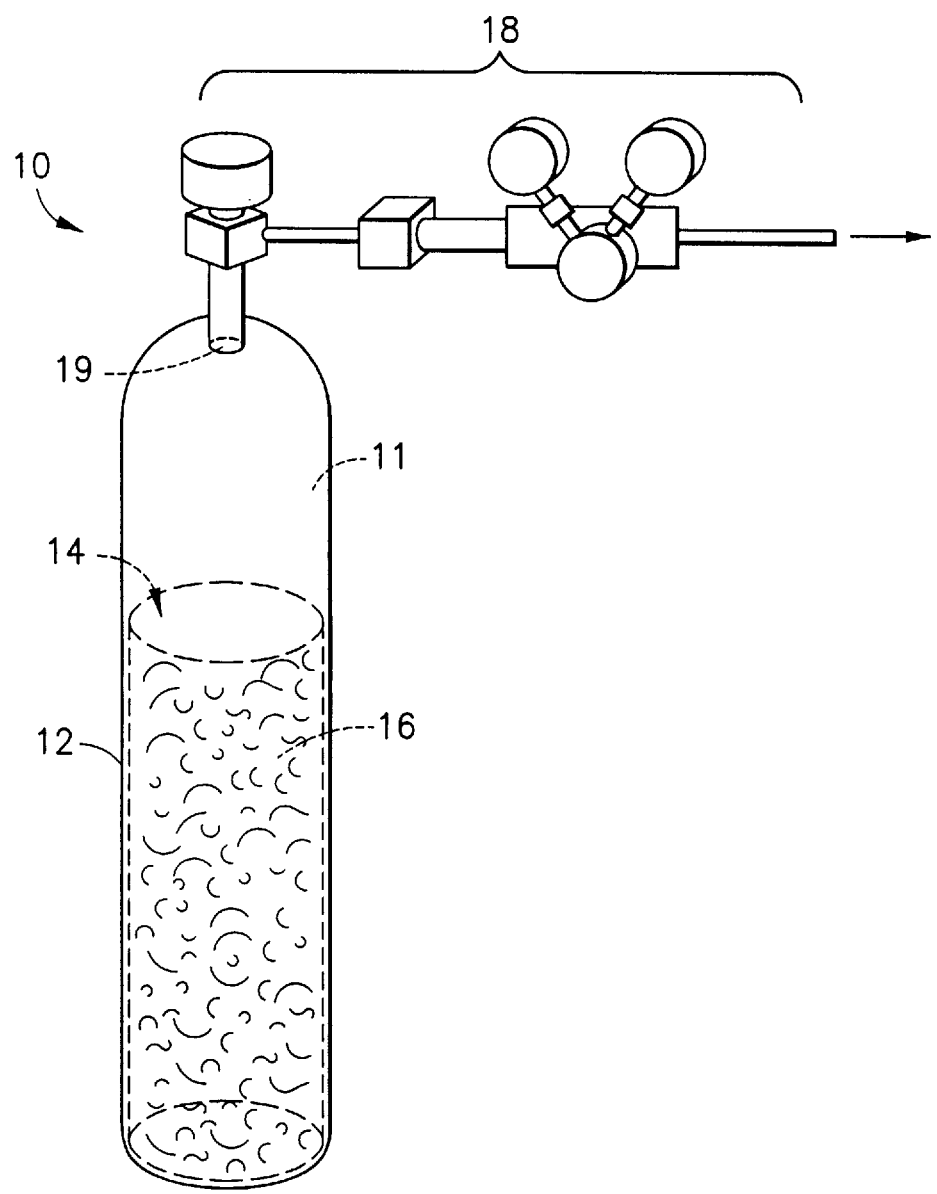
FIG. 1 is a schematic perspective representation of a storage and dispensing vessel and associated flow circuitry according to one embodiment of the invention, which may be usefully employed for the storage and dispensing of fluid.

Referring now to the drawings, FIG. 1 is a schematic representation of a storage and dispensing system 10 comprising storage and dispensing vessel 12. The storage and dispensing vessel may for example comprise a conventional gas cylinder container of elongate character. In the interior volume of such vessel is disposed a bed 14 of a suitable sorbent medium 16.

The vessel 12 is provided at its upper end with a conventional cylinder head fluid dispensing assembly 18 coupled with the main body of the cylinder 12 at the port 19. Port 19 allows fluid flow from the interior volume 11 of the cylinder into the dispensing assembly 18. To prevent entrainment of particulate solids in the fluid being dispensed from the cylinder, the port 19 may be provided with a frit or other filter means therein.

The vessel 12 may be provided with internal heating means (not shown) which serve to thermally assist desorption of the sorbate fluid. Preferably, however, the sorbate fluid is at least partially, and most preferably fully, dispensed from the storage and dispensing vessel containing the adsorbed fluid by pressure differential-mediated desorption. Such pressure differential may be established by flow communication between the storage and dispensing vessel, on the one hand, and the exterior dispensing environment or locus of use, on the other.

The sorbent medium 16 may comprise any suitable sorptively effective material, having sorptive affinity for the fluid to be stored and subsequently dispensed from the vessel 12, and from which the sorbate is suitably desorbable. Examples include a crystalline aluminosilicate composition, e.g., a micropore aluminosilicate composition with a pore size in the range of from about 4 to about 13 Å, a mesopore crystalline aluminosilicate composition with a pore size in the range of from about 20 to about 40 Å, a carbon sorbent material such as a bead activated carbon sorbent of highly uniform spherical particle shape, e.g., BAC-MP, BAC-LP, and BAC-G-70R bead carbon materials (Kureha Corporation of America, New York, N.Y.), silica, alumina, macroreticulate polymers, kieselguhr, etc.

The sorbent material may be suitably processed or treated to ensure that it is devoid of trace components which may deleteriously affect the performance of the fluid storage and dispensing system. For example, the sorbent may be subjected to washing treatment, e.g., with hydrofluoric acid, to render it sufficiently free of trace components such as metals and oxidic transition metal species.

The sorbent may be provided in the form of particles, granules, extrudates, powders, cloth, web materials, honeycomb or other monolithic forms, composites, or other suitable conformations of useful sorbent materials, having sorptive affinity for the fluid sought to be stored and subsequently dispensed, and satisfactory desorption characteristics for the dispensing operation.

As mentioned, although it generally is preferred to operate solely by pressure differential, in respect of the sorption and desorption of the gas to be subsequently dispensed, the system of the invention may in some instances advantageously employ a heater operatively arranged in relation to the storage and dispensing vessel for selective heating of the solid-phase physical sorbent medium, to effect thermally-enhanced desorption of the sorbed fluid from the solid-phase physical sorbent medium.

The apparatus of the invention optionally may be constructed with a solid-phase physical sorbent medium being present in the storage and dispensing vessel together with a chemisorbent material having a sorptive affinity for contaminants, e.g., decomposition products, of the sorbate fluid therein.

Figure 2:
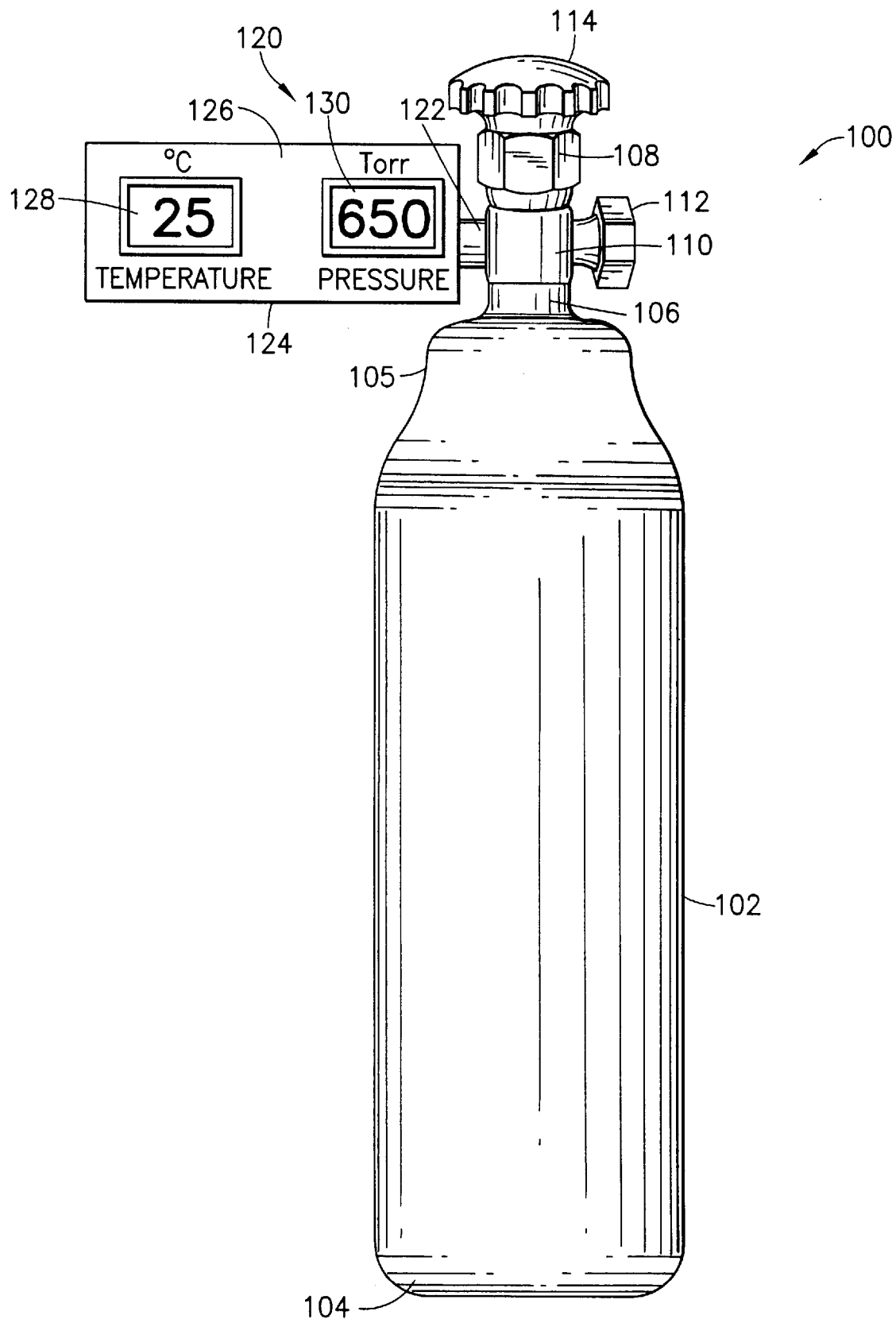
FIG. 2 is a perspective view of a gas storage and dispensing system according to one embodiment of the invention, featuring transducer-actuated temperature and pressure output display means integrated with the valve head structure in the system.

Referring now to FIG. 2, there is shown a perspective view of a storage and dispensing system 100 according to one embodiment of the invention.

The storage and dispensing system 100 comprises a cylinder 102 of elongate character having an upper portion 105 including neck 106, and a lower portion 104 having a flat bottom so that the cylinder may be reposed in vertically upstanding relationship on a support surface.

Coupled to the neck 106 of the cylinder 102 is a manual or automated (by electrical or air means) high pressure stainless steel diaphragm valve 108 comprising a valve body 110 which is secured to the neck 106 of cylinder 102 in any suitable manner, as for example by means of complimentarily matable threading on the respective engaging surfaces of the valve body 110 and neck 106, as augmented by thread-locking adhesive, sealant, or other medium applied to the threaded surfaces and serving to ensure gas-impermeability and leak-tightness of the completed assembly.

The valve 108 comprises a manual actuator handle 114 which may be manually rotated to open or close the valve. The valve body 110 is connected to a discharge flange coupling 112, by means of which the storage and dispensing vessel can be joined to suitable dispensing assembly means comprising piping, tubing, conduits, instrumentation, mass flow controllers, flow regulators of other types, purifiers, filters, etc. The valve 108 may optionally be pneumatically activatable.

The valve body 110 as shown is joined to a connector section 122 of an output display 120 comprising a display housing 124. The display housing 124 features on its front face 126, in the embodiment shown, a temperature indicating display module 128 and a pressure output display module 130. The housing 126 contains suitable processing circuitry coupled with the display modules, and coupled in circuit-forming relationship with pressure and temperature transducers (not shown in FIG. 2) which extend through connector section 122 and are disposed operatively in the valve body 110 upstream of the active valve element (which is a diaphragm in the illustrative embodiment, not shown in FIG. 2, but see FIG. 3, hereinafter described) for sensing the temperature and pressure in the interior volume of cylinder 102.

The pressure and temperature transducers employed in the broad practice of the present invention may be of any suitable commercially available type, which may be operatively reposed in the valve body in a simple, readily mechanically constructed manner, e.g., by the expedient of drilling of appropriate transducer vias in the valve body 110, for passage therethrough of the transducer elements. By such arrangement, the transducer elements are deployed in the fluid flow path of the desorbate medium in the dispensing mode of the storage and dispensing system. The transducer elements are leak-tightly sealed in such vias, utilizing a sealant medium such as that employed for sealing of the threading of the complimentary mating surfaces of the valve 108 and cylinder 102, as previously described.

Figure 3:
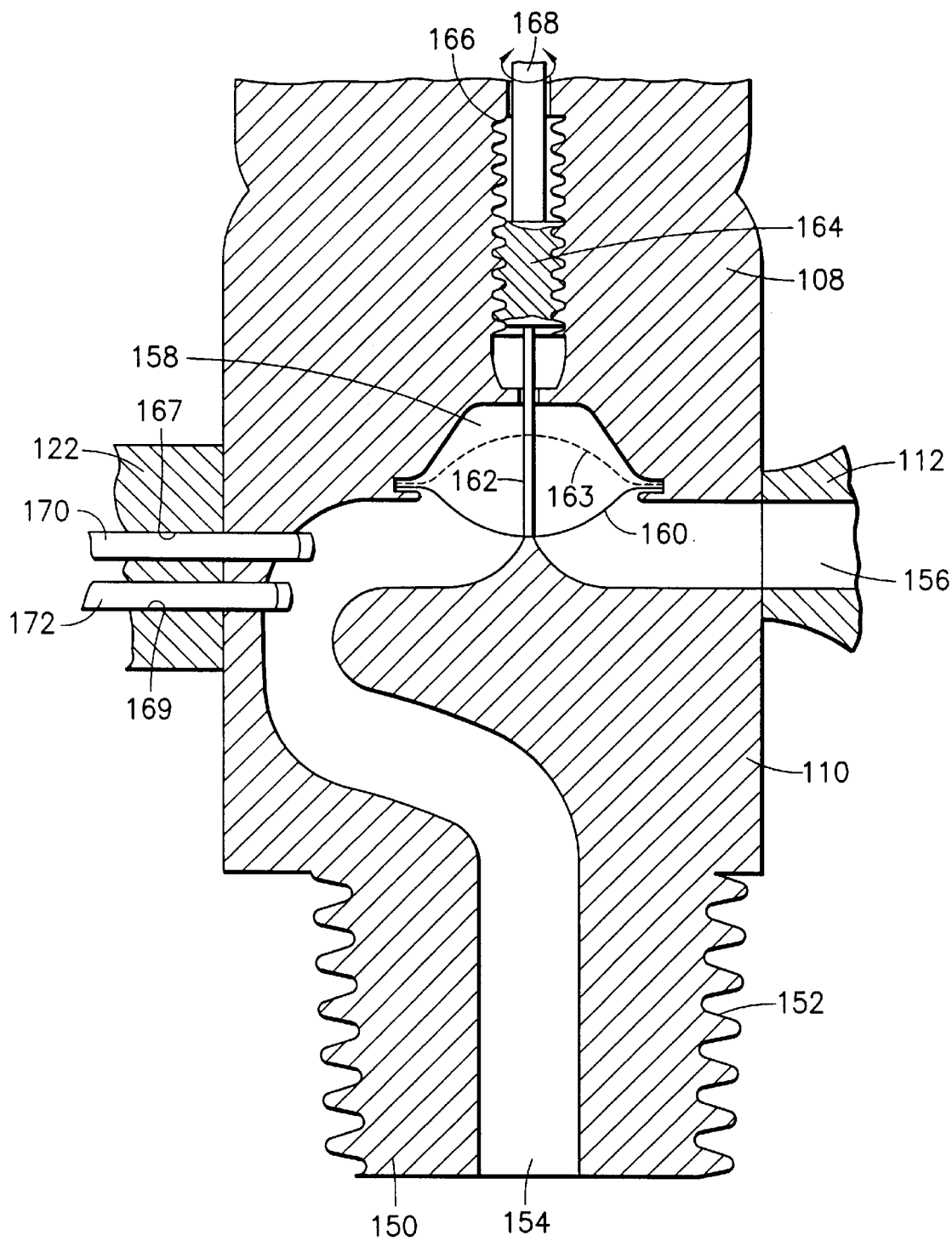
FIG. 3 is a cross-sectional schematic view of the interior of the valve body and associated connector segment of the output display means, showing the location of the transducer elements relative to the active valve element.

FIG. 3 is a cross-sectional elevation view of a portion of the valve head and connector segment for the pressure and/or temperature monitoring display means, showing the details of construction thereof. The pressure transducer type could be of the capacitance or strain gauge type.

As shown, the valve 108 comprises a valve body 110 containing a valve diaphragm element 160 disposed in the working volume of chamber 158. The chamber 158 is in latent flow communication with valve inlet passage 154, communicating with the interior volume of the storage and dispensing vessel, when the lower portion 150 of the valve body bearing external threading surface 152 is matably engaged with the port at the upper portion of the storage and dispensing cylinder.

The diaphragm is manually actuated by rotation of shaft 168 integrally joined to a threaded shank portion 164. The threaded shank portion 164 in turn is joined to valve actuator stem 162, which is selectively translatable in the vertical direction between the position shown, where the diaphragm is in the closed position (precluding flow between the valve inlet passage 154 and valve discharge passage 156 communicating with valve coupling 112).

The handle of the valve (element 114 as shown in FIG. 2) may be rotatably translated to retract the stem element 162 from the closed position, so that the diaphragm is released to return to the position indicated by dashed line 163 in FIG. 3. By such vertical advancing or retracting movement, the diaphragm is selectively positioned for permitting or occluding flow through the valve passages 154 and 156.

The connector section 122 of the output means, as previously described, has respective vias 167 and 169, in which are reposed a temperature transducer element 170 (in via 167) and a pressure transducer element 172 (in via 169). The vias extend through the valve body 110 to permit the respective transducer elements 170 and 172 to be disposed, as illustrated, in the inlet passage 154 of the valve.

The transducer elements 170 and 172 thus extend distally into the valve inlet passage upstream of the active valve element. The transducer elements at their distal ends are joined to suitable electric or electronic circuit-forming means (not shown) coupled with the display output elements shown in FIG. 2.

By the foregoing arrangement, the pressure and temperature in the storage and dispensing vessel can be continuously, intermittently, or otherwise selectively monitored in real-time fashion, and as shown in FIG. 2 a prominent visual output may be generated on the display modules of the housing 124.

Alternatively, as discussed, the output module may comprise suitable visual alarm means such as flashing LED illumination means, audible alarms such as buzzers or chimes, or other suitable output alarm means evidencing the over-pressure and/or over-temperature conditions in the storage and dispensing vessel.

While the FIG. 2 embodiment has been illustrated as comprising temperature and pressure monitoring means, it will be recognized that it may be satisfactory in some instances to utilize only temperature monitoring or only pressure monitoring means, and accordingly all permutative and combinatorial arrangements of pressure and/or temperature sensing means and method are contemplated within the broad purview of the present invention, as well as other process conditions such as composition of the fluid in the storage and dispensing vessel (e.g., by means of a quartz microbalance sensor for impurity species in the fluid).

Pressure sensors potentially useful in the broad practice of the invention include piezoelectric, capacitance, and strain gauge types. Capacitance sensors for pressure sensing are most preferably of a diaphragm type, and afford high accuracy. A capacitance diaphragm pressure transducer element may for example be welded into a port in the valve head of a fluid storage and dispensing cylinder constructed in accordance with the present invention. One commercially available pressure transducer which may be advantageously employed in the general practice of the invention is a Mini-Baratron Gage and Absolute Pressure Transducer (available in Type 740 Gage and Type 750 Absolute General Purpose Pressure Transducer models, from MKS Instruments, Inc.).

Temperature sensors useful in the invention include RTD, thermocouple, and thermistor types. Thermocouple or other types of sensors for temperature sensing may be inserted in a sheath to depend through a valve head into the sorbent material bed, so as to make intimate contact with the sorbent material, in order to obtain high level accuracy in temperature measurement. The ideal interior point of temperature measurement is the central interior location, because it takes the longest to thermally equilibrate. Multiple RTD or thermocouple readouts for various locations in the bed may be provided to enhance the accuracy of the temperature sensing.

Thus, while the invention has been shown and described with reference to specific features, aspects and embodiments herein, it will be appreciated that the invention is susceptible of a wide variety of other embodiments, features and implementations consistent with the disclosure herein, and the invention is therefore to be broadly construed and interpreted, within the spirit and scope of the foregoing disclosure.

What is claimed is:

1. A fluid storage and dispensing system, comprising a fluid storage and dispensing vessel defining an interior volume therewithin containing a sorbent material, a fluid adsorbed on the sorbent material at an interior gas pressure not exceeding about one atmosphere at 25° C., and a dispensing assembly for selectively discharging fluid from the vessel, the dispensing assembly including a flow controller for selectively establishing flow of fluid from the vessel through the dispensing assembly, and selectively terminating flow of fluid from the vessel through the dispensing assembly, with monitoring means disposed in the dispensing assembly upstream of the flow controller for monitoring a process condition of the fluid in the vessel when the flow controller is unactuated and there is no flow of fluid through the dispensing assembly.

2. A system according to claim 1, wherein the process condition monitored by the monitoring means is selected from the group of process conditions of fluid temperature and fluid pressure.

3. A system according to claim 1, wherein the process condition monitored by the monitoring means is fluid temperature.

4. A system according to claim 1, wherein the process condition monitored by the monitoring means is fluid pressure.

5. A system according to claim 1, wherein the process condition monitored by the monitoring means is fluid composition.

6. A system according to claim 1, wherein the flow controller comprises a valve.

7. A system according to claim 1, wherein the vessel comprises a discharge port, and the dispensing assembly comprises a manifold coupled to the discharge port.

8. A system according to claim 1, wherein the monitoring means comprises an output display.

9. A system according to claim 1, wherein the monitoring means comprises an alarm arranged to be actuated when the process condition exceeds allowable limits.

10. A system according to claim 1, wherein the monitoring means comprises an audible alarm.

11. A system according to claim 1, wherein the monitoring means comprises a visual alarm.

12. A system according to claim 1, wherein the process condition comprises fluid temperature and fluid pressure.

13. A system according to claim 1, wherein the sorbent material is selected from the group consisting of carbon, silica, alumina, aluminosilicates, kieselguhr, and macroreticulate polymers.

14. A system according to claim 1, wherein the sorbent material comprises activated carbon.

15. A system according to claim 1, wherein the vessel comprises a vertically upstanding cylindrical container, having a top discharge port for top-end dispensing.

16. A system according to claim 15, wherein the vessel has a valve head assembly joined to the top discharge port thereof.

17. A system according to claim 1, wherein the process condition is fluid temperature, and the monitoring means comprise a temperature transducer arranged in the dispensing assembly in sensing relationship to the fluid.

18. A system according to claim 1, wherein the process condition is fluid pressure, and the monitoring means comprise a pressure transducer arranged in the dispensing assembly in sensing relationship to the fluid.

19. A gas storage and dispensing system, comprising:

a gas storage and dispensing vessel, said vessel being closed to gas flow except at an upper end thereof defining a neck of the vessel;

a physical adsorbent material in the vessel, having sorptive affinity for the gas to be stored in and dispensed from the system;

a valve body leak-tightly joined to the neck of the vessel, said valve body including a valve body chamber therein, and inlet and outlet passages in said valve body communicating with said valve body chamber;

a valve element in said valve body chamber and selectively translatable therein to selectively establish or occlude gas flow communication through said inlet passage, chamber and outlet passage;

means for selectively translating said valve element in said valve body chamber to selectively establish or occlude said gas flow communication;

a transducer via in the valve body communicating with said valve body inlet passage;

a transducer element leak-tightly sealed in said via, and arranged in sensing relationship to gas present in said valve body inlet passage, for sensing a characteristic of gas present in said valve body inlet passage; and output means operatively coupled to said transducer element, for outputting said characteristic of gas present in the valve body inlet passage and sensed by the transducer element.

20. A system according to claim 19, wherein the valve element comprises a valve diaphragm element.

21. A system according to claim 19, wherein the valve body is threadably engaged with the neck of the vessel.

22. A system according to claim 19, wherein the valve body is joined to a gas dispensing assembly.

23. A system according to claim 19, wherein the transducer element comprises a pressure transducer.

24. A system according to claim 23, wherein said pressure transducer is selected from the group consisting of piezoelectric pressure transducers, capacitance pressure transducers, and strain gauge pressure transducers.

25. A system according to claim 19, wherein said transducer element comprises a temperature transducer.

26. A system according to claim 25, wherein said temperature transducer is selected from the group consisting of RTD temperature transducers, thermocouple temperature transducers and thermistor temperature transducers.

27. A system according to claim 19, wherein said gas characteristic is temperature, and the transducer element comprises a thermocouple extending through said via into the physical adsorbent material in the vessel, for temperature monitoring of the physical adsorbent material.

28. A system according to claim 19, wherein said output means include an output module secured to the valve body and constructed and arranged to produce a visual and/or audible output of the gas characteristic being monitored.

29. A system according to claim 19, wherein the means for selectively translating the valve element include an actuator.

30. A gas storage and dispensing system, comprising:

a gas storage and dispensing vessel of vertically elongate character including an upper neck providing a gas outlet opening for the vessel;

a physical adsorbent material in said vessel, said physical adsorbent material being selected from the group consisting of carbon, silica, alumina, aluminosilicate, macroreticulate polymer and kieselguhr adsorbent materials;

a valve body leak-tightly secured to the neck of the vessel, said valve body including an interior valve chamber communicating with a gas inlet passage in flow communication with the vessel, and a gas discharge passage for discharging gas from the valve body;

a valve element assembly including a valve element operably disposed in the interior valve chamber and arranged to selectively establish or terminate gas flow through the interior valve chamber from the gas inlet passage to the gas discharge passage thereof;

gas condition sensing means mounted in the valve body and in sensing relationship to gas in the gas inlet passage of the valve body; and output means operatively coupled with the gas condition sensing means and arranged to provide an output indicative of a selected gas characteristic in the vessel.

* * * * *